Feb. 25, 1936. S. D. ROBINS 2,031,618
BEARING AND CARRIER
Filed May 2, 1934 2 Sheets-Sheet 1
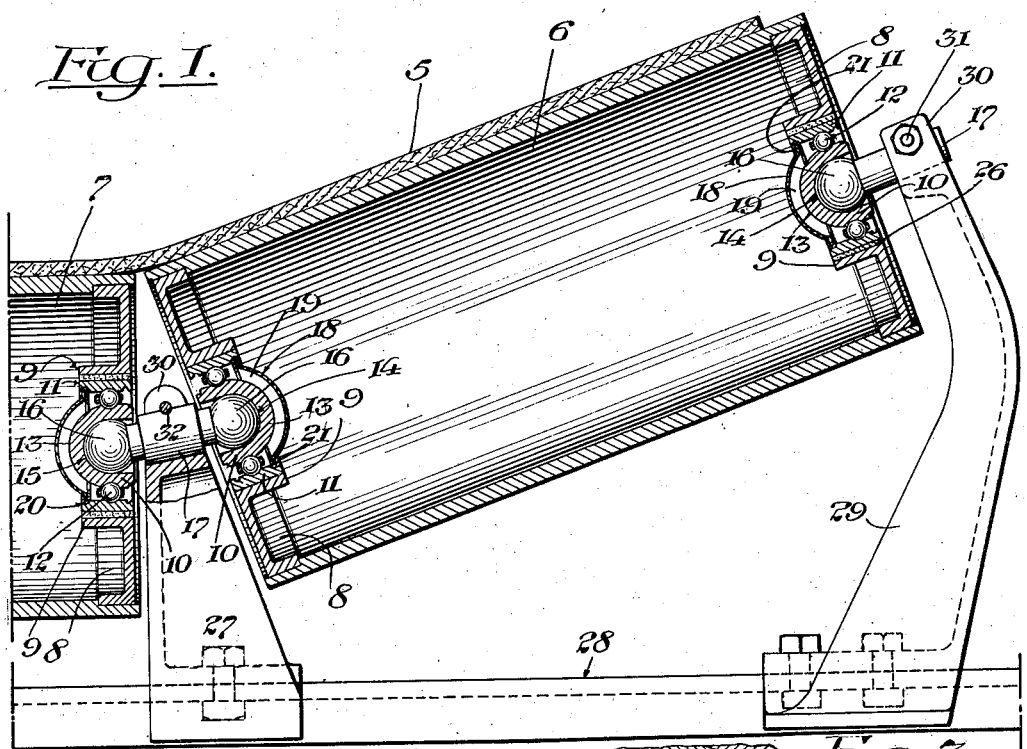
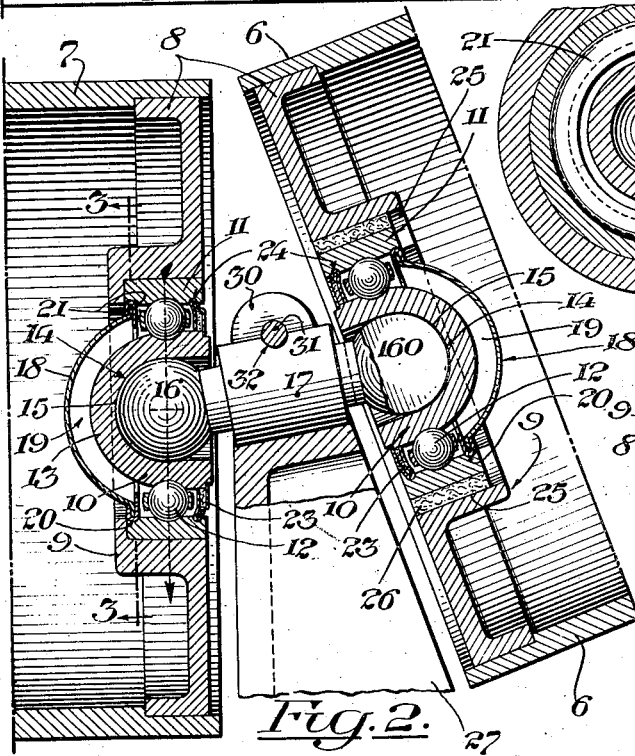
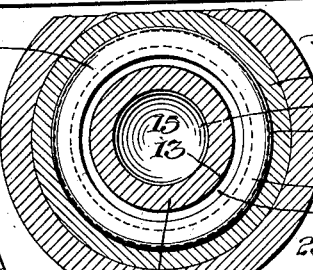
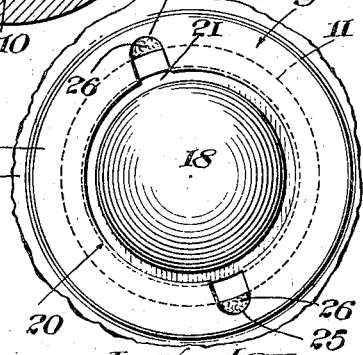
Inventor:
Samuel Davis Robins
by his Attorney
John A. Nolan Feb. 25, 1936.  S. D. ROBINS  2,031,618
BEARING AND CARRIER
Filed May 2, 1934  2 Sheets-Sheet 2

Inventor
Samuel Davis Robins
by his Attorney
John A. Nolan

Patented Feb. 25, 1936

2,031,618

UNITED STATES PATENT OFFICE 2,031,618

BEARING AND CARRIER

Samuel Davis Robins, Manhasset, N. Y., assignor to Robins Conveying Belt Company, Passaic, N. J., a corporation of New Jersey Application May 2, 1934, Serial No. 723,451

11 Claims. (Cl. 308—194)

This invention relates to anti-friction bearings and carriers, having reference particularly, though not exclusively, to bearings for use in connection with conveyer idlers and similar carrier rolls or rollers.

One of the objects of my invention is to provide a novel grease-packed bearing comprising a sealed self-contained assembly of simple, inexpensive and efficient construction.

Another object of my invention is to provide a bearing which, together with an associated roll or other rotatable element, is mountable on axial end supports in such manner that the proper working position of the said element is insured without recourse to nice fitting or adjustment of the supports in respect to the axis of rotation of the element.

A further object of the invention is to provide for conveyer rolls and the like, bearings seated therein, and mountings for said bearings of such character that the rolls with the bearings can be readily assembled in or disassembled from the conveyer structure.

With these objects in view, and others which will presently appear, my invention comprises novel features of construction and organizations of parts which in exemplifying forms will be hereinafter described; the scope of the invention then being expressed in the appended claims.

In the drawings—

Figure 1 is a sectional elevation of a portion of a conveyer idler unit showing one of the inclined end rolls and the adjacent end of the adjoining roll as equipped with bearings and mountings embodying the principle of my invention.

Fig. 3 is a transverse vertical section through one of the bearings, as on the line 3—3 of Fig. 2.

Fig. 4 is a rear elevation of one of the bearings and a portion of the roll head in the hub of which the bearing is supported.

Figs. 7 and 8 are sections of modified forms of bearings hereinafter referred to.

Figure 5:
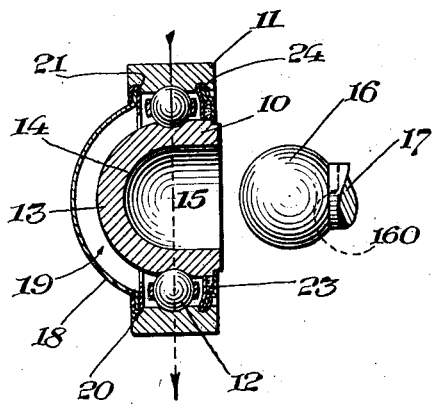
Fig. 5 is a section of the self-contained bearing assembly showing the spherical terminal of an adjacent shaft.

My invention is illustrated as embodied in a troughing idler structure for a conveyer belt 5, only one of the upwardly and outwardly extending rolls 6 and the proximate end of the adjacent horizontal roll 7 being shown since the rolls at the respective sides of a structure of this kind correspond with each other in form and arrangement.

Each of the rolls includes an end head 8 having a central hub 9 in which my improved bearing is mounted. This bearing is a self-contained assembly embodying inner and outer race-members 10 and 11, respectively, providing therebetween an annular race-way for a series of anti-friction members 12, preferably of the ball type. As herein illustrated the outer race member comprises an internally grooved ring tightly fitted in the opening of the roll head so as to rotate with the roll, and the inner race member comprises an externally grooved body supported in spaced concentric relation to the member 11 and terminating in a rearwardly extending approximately semi-spherical portion 13. The inner member has formed therein an axially extending socket 14 which opens at the front end of the member and provides within such member a concave seat 15 for the spherical terminal portion 16 of a stationary supporting shaft 17 hereinafter described.

Affixed to or formed on the rear of the outer race member 11 is an imperforate sealing wall comprising in an efficient form a cap 18 which conforms substantially with and is spaced from the convex surface of the adjacent race body to provide a grease space or reservoir 19.

The cap 18 is fixedly held at its periphery in an annular recess 20 formed in the rear of the inner wall of the outer race member 11, preferably by crimping the peripheral portion of a sheet metal annulus 21 around the periphery of the cap and pressing the associated peripheral portions into recess. The annulus 21 surrounds the proximate end of the ball race-way and provides an end wall therefor, which wall may have a close clearance fit with the adjacent edge of the inner race member in order to permit relative rotary movement of the two race members, or, as herein shown, the annulus 21 may be suitably spaced from the inner race member to afford free communication between the grease reservoir and the race-way.

When the respective members of the bearing are assembled, as hereinbefore described, grease is introduced into the open front of the race-way until the race-way is packed with the lubricant, or until the reservoir is also packed therewith, whereupon such front is closed, preferably by means of an annular seal 23 which is detachably sprung into locking engagement with a recess 24 formed in the inner wall of the outer race member in proximity to the balls or their cage. No claim is made herein to the particular form of seal illustrated.

As a simple and efficient means to facilitate the removal of the bearing assembly from the roll, as occasion may require, the inner wall of the hub 9 is provided with diametrically-disposed grooves 25 which extend through the hub so as to permit the insertion of the legs of a suitable extracting tool between the hub and the bearing. When the bearing is mounted in the hub the grooves are filled with removable packing material, 26, such, for example, as cork, leather or solder.

Figure 2:
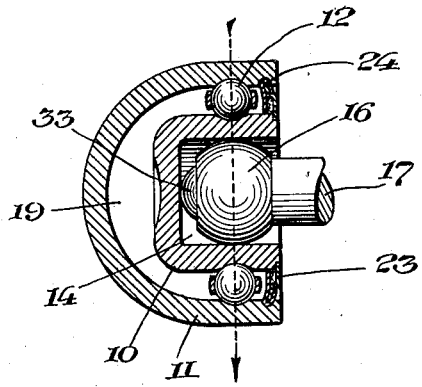
Fig. 2 is an enlarged section of the adjacent ends of the said rolls, their bearings and mountings, one of the rolls being relatively positioned to show the closed hub grooves therein.

The concave seats 15 of the respective bearing bodies 10 conform with the spherical terminals of the stationary supporting shafts 17 at the respective ends of the rolls, and therefore each roll and its associated bearings have capacity for movement in respect to such terminals in order to insure the proper axial position of the roll when it is mounted on the shafts, and this without recourse to nice fitting or adjustment of the shafts in respect to the axis of the roll. Preferably the spherical terminals of the shafts are snugly fitted in the central race bodies of the roll so that while said bodies are movable to any desired angle within practical limits, yet they are frictionally restrained against rotation on the shaft terminals. Also the seat 15 in each of the race bodies 10 is so positioned relatively to the race-way that the plane of rotation of the balls 12 in the race-way passes approximately through the center of the spherical terminal of the associated shaft, as indicated by the dotted arrow in Fig. 2, and therefore the radical load on the roll is directly transmitted through the balls and the body of the spherical terminal in a manner to avail of the maximum supporting capacity of the terminal and also to insure the efficient automatic positioning of the bearing and roll in respect to such terminal.

Figure 6:
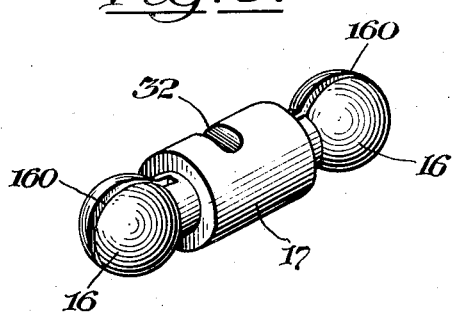
Fig. 6 is a separate view of a shaft for two adjacent bearings.

To contribute to the efficient frictional contact between the spherical terminals and the inner walls of the race bodies 10, such terminals are slotted, as at 160, thus being laterally expansible to any desired extent. (See Fig. 6.)

Where, as herein illustrated, the bearing is used in connection with a troughing idler structure, the shaft between adjacent rolls is preferably supported in slightly inclined position at the upper end of an upstanding bracket 27 on the base 28, which shaft is provided at its respective ends with the spherical surfaces 16 on which the socketed members of the adjacent bearings are seated. The stub shaft 17 at the outer end of the inclined roll 6 is supported in inclined position on the upper end of an adjacent upstanding bracket 29 and is provided at its inner end with a spherical surface which is received by the socket member of the proximate bearing of the inclined roll. The shafts are slidably and detachably supported in the respective brackets so as to facilitate the assembly or disassembly of the rolls. To this end the top of each of the brackets is bored and split to afford clamping jaws 30 between which the shaft is firmly clamped by means, for example, of a cross bolt 31 which extends through the jaws and through a suitably-disposed groove 32 in the shaft.

Preferably the inclined roll 6 is endwise spaced somewhat from the adjacent bracket 29, so that the stub shaft when it is unclamped may be withdrawn from the proximate bearing socket to enable the roll to be bodily shifted endwise for application to or removal from the shaft at the lower end of the roll, without the otherwise necessity of shifting the bracket 29. In the absence of the end rolls the horizontal roll can be readily mounted or removed by properly positioning the adjacent shafts in respect to the proximate bearing sockets of the latter roll.

In Fig. 7 I have shown a modification wherein the inner race body 10 is formed with a cylindrical socket 14 to receive the spherical terminal 16 of the supporting shaft 17 and the outer wall of the grease reservoir 19 is an integral part of the outer race member 11. In this construction the inner end of the terminal 16 is reduced to provide a thrust member 33 which abuts against the end wall of the socket.

Figure 8:
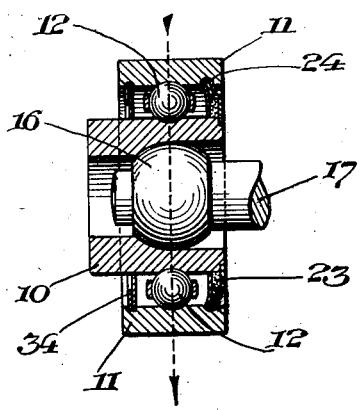

In Fig. 8 I have shown another modification wherein the inner race member 10 consists of a tubular body internally shaped to provide a seat for the spherical terminal 16 of the supporting shaft. In this construction the rear of the ball race-way is closed by a sealing ring 34.

While I have herein shown and described an exemplifying embodiment of my invention in connection with idlers or rolls for a belt conveyer, it is obvious that the invention may be employed in connection with rolls or rollers for gravity conveyers and also for other purposes.

I claim—

1. An anti-friction bearing mountable on a spherical head on a support, comprising a self-contained assembly embodying inner and outer race members providing an annular race-way therebetween, the inner member comprising a body having a rearwardly extending portion, there being a concaved socket in said extension forming a seat for the spherical end of the support, said socket being adapted for free admission and removal of the spherical end of the support, anti-friction members in said race-way, a cap having its peripheral edge fixedly seated in the outer race member at the rear of the race-way and spacially enclosing the rear of the inner race member, and a seal for the open front of the race-way.

2. An anti-friction bearing mountable on a support having a spherical end, said bearing comprising a self-contained assembly embodying inner and outer race members providing an annular race-way therebetween, the inner member comprising a hollow body open at its forward end and providing a seat at the other end for the spherical end of said support, anti-friction members in said race-way, a wall on the outer race member at the rear of the raceway and spacially enclosing the rear of the said hollow body, and a seal for the open front of the race-way.

3. An anti-friction bearing mountable on a support having a spherical end, said bearing comprising a self-contained assembly embodying inner and outer race members providing an annular race-way therebetween, the inner member comprising a hollow body open at its forward end and having a rearwardly extending portion providing a concave seat for the spherical end of said support, anti-friction members in said race-way, a wall on the outer race member at the rear of the race-way and spacially enclosing the rear of the said hollow body, and a seal for the open front of the race-way.

4. An anti-friction bearing mountable on a support having a spherical end, said bearing comprising a self-contained assembly embodying inner and outer race members providing an annular race-way therebetween, anti-friction members in said race-way, the inner race member comprising a hollow body open at one end and at its other end providing for said spherical end of the support a seat so positioned that the plane of rotation of the anti-friction members passes approximately through the center of the spherical end of said support, a rear wall on the outer race member spacially enclosing the rear of the said hollow body, and a seal for the open front of the race-way.

5. An anti-friction bearing mountable on a support having a spherical end, said bearing comprising a self-contained assembly embodying inner and outer race members providing an annular race-way therebetween, and anti-friction members in said raceway, the inner race member comprising a body having a central socket therein open at one end and providing an internal concave seat for the spherical end of said support.

6. An anti-friction bearing mountable on a support having a spherical end, said bearing comprising a self-contained assembly embodying inner and outer race members providing an annular race-way therebetween, and anti-friction members in said raceway, the inner race member comprising a body having a central socket therein open at one end and providing an internal concave seat which snugly fits said spherical end of the support and is frictionally held thereby to restrain said body against rotation.

7. An anti-friction bearing mountable on a support having a spherical end, said bearing comprising a self-contained assembly embodying inner and outer race members providing an annular race-way therebetween, and anti-friction members in said raceway, the inner member comprising a hollow body open at one end and at its other end providing for the spherical end of said support an internal seat so positioned that the plane of rotation of the anti-friction members passes approximately through the center of the spherical end of the support.

8. A roll, an anti-friction bearing therein mountable on a support having a spherical end, said bearing including anti-friction members and an inner race member therefor, said race member comprising a hollow body open at one end and providing for said spherical end of said support an internal seat so positioned that the plane of rotation of the anti-friction members passes approximately through the center of the spherical end of the support.

9. A roll, anti-friction bearings in the respective ends thereof, and stationary shafts having spherical ends for supporting the respective bearings, said bearings each comprising a self-contained assembly embodying inner and outer race members and anti-friction members therebetween, inner race member providing for the proximate spherical end a seat so positioned that the plane of rotation of the anti-friction members passes approximately through the center of the spherical end of the shaft, said seat snugly fitting the proximate spherical end and being frictionally held thereby to restrain said inner race member against rotation.

10. Rolls arranged in endwise relation and including inclined end rolls, anti-friction bearings at the ends of the respective rolls, and stationary shafts having spherical ends for the respective bearings, said bearings embodying inner and outer race members and anti-friction members therebetween, the inner race member comprising a body open at one end and providing for the proximate spherical end of the shaft a seat so positioned that the plane of rotation of the anti-friction members passes approximately through the center of the spherical end of the shaft.

11. Rolls arranged in endwise relation and including inclined end rolls, anti-friction bearings at the ends of the respective rolls, and stationary shafts having spherical ends for the respective bearings, said bearings each embodying inner and outer race members and anti-friction members therebetween, the inner race member comprising a hollow body open at one end and providing for the proximate spherical end of the shaft a seat so positioned that the plane of rotation of the anti-friction members passes approximately through the center of the spherical end, said seat snugly fitting the proximate spherical end and being frictionally held thereby to restrain said inner race member against rotation.

SAMUEL DAVIS ROBINS.